Figure 1:
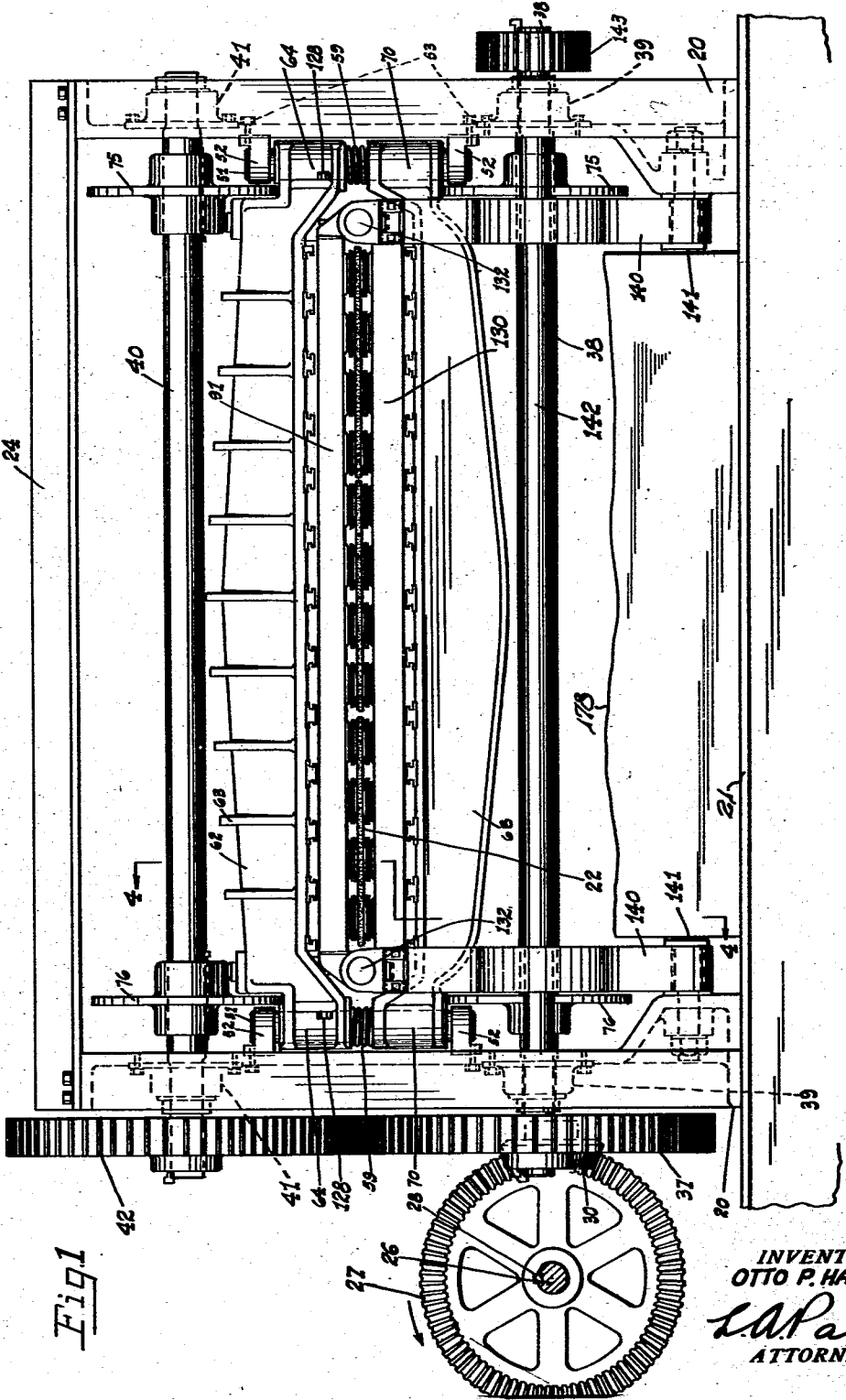

Nov. 5, 1940.  O. P. HAEGELE  2,220,236

PUNCHING MACHINE

Filed Sept. 12, 1938  6 Sheets-Sheet 1

INVENTOR
OTTO P. HAEGELE
L. A. Paley
ATTORNEY

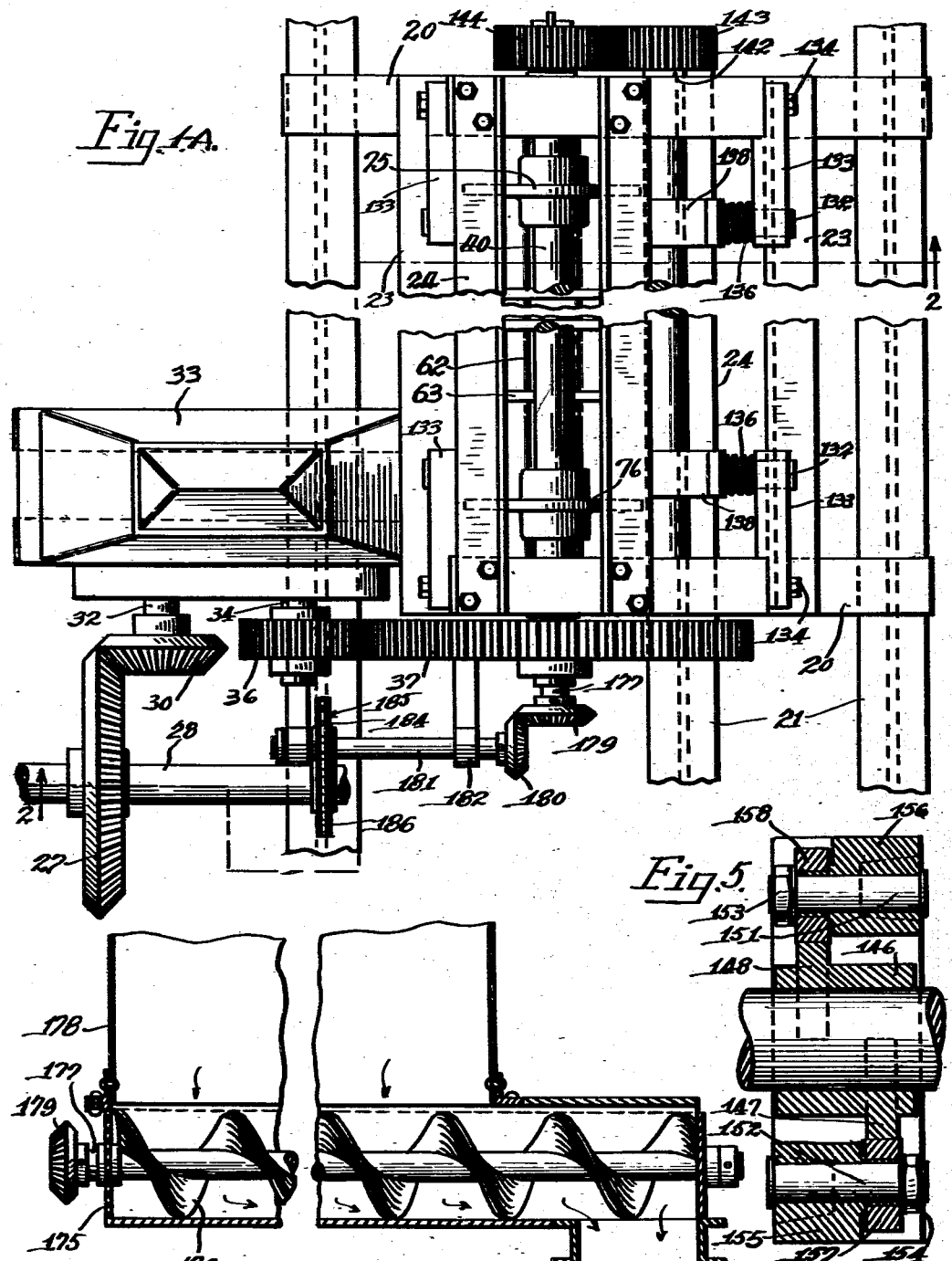

Nov. 5, 1940.  O. P. HAEGELE  2,220,236
PUNCHING MACHINE
Filed Sept. 12, 1938  6 Sheets-Sheet 3

STRIPPERS
EJECTORS
PUNCHES

INVENTOR
OTTO P. HAEGELE
L. A. Paley
ATTORNEY

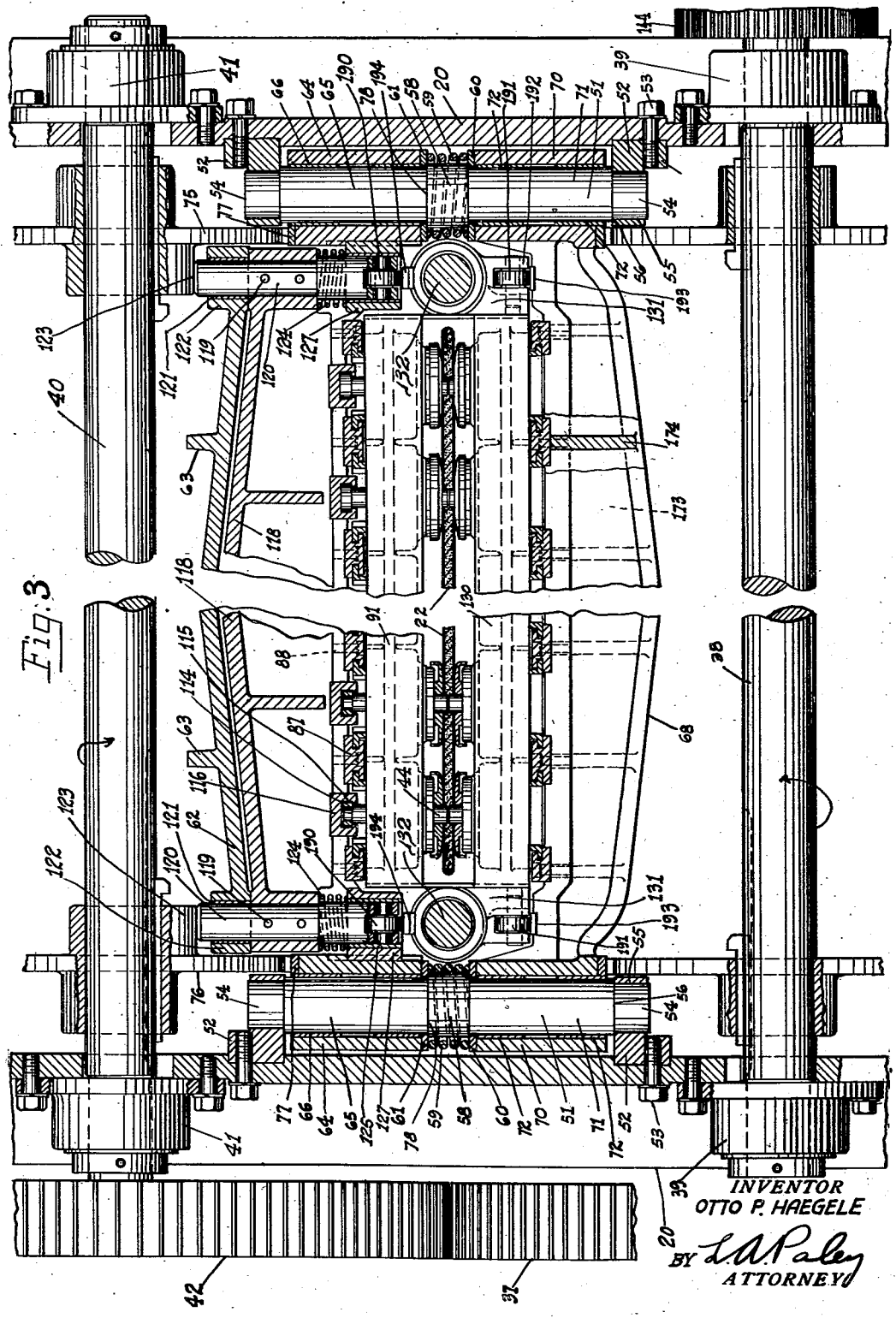

Nov. 5, 1940.    O. P. HAEGELE    2,220,236
PUNCHING MACHINE
Filed Sept. 12, 1938    6 Sheets-Sheet 5
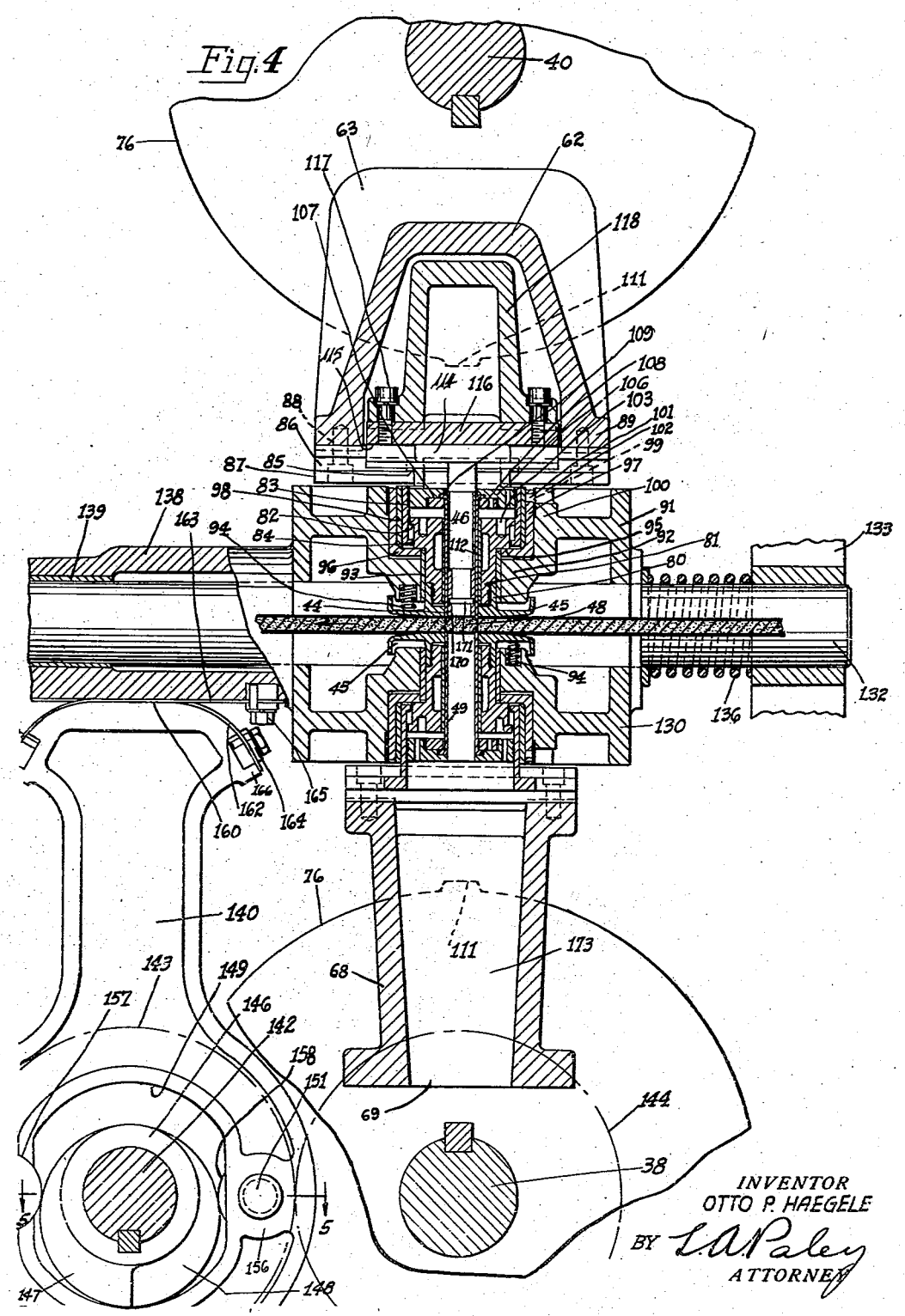
INVENTOR
OTTO P. HAEGELE
BY L. A. Paley
ATTORNEY

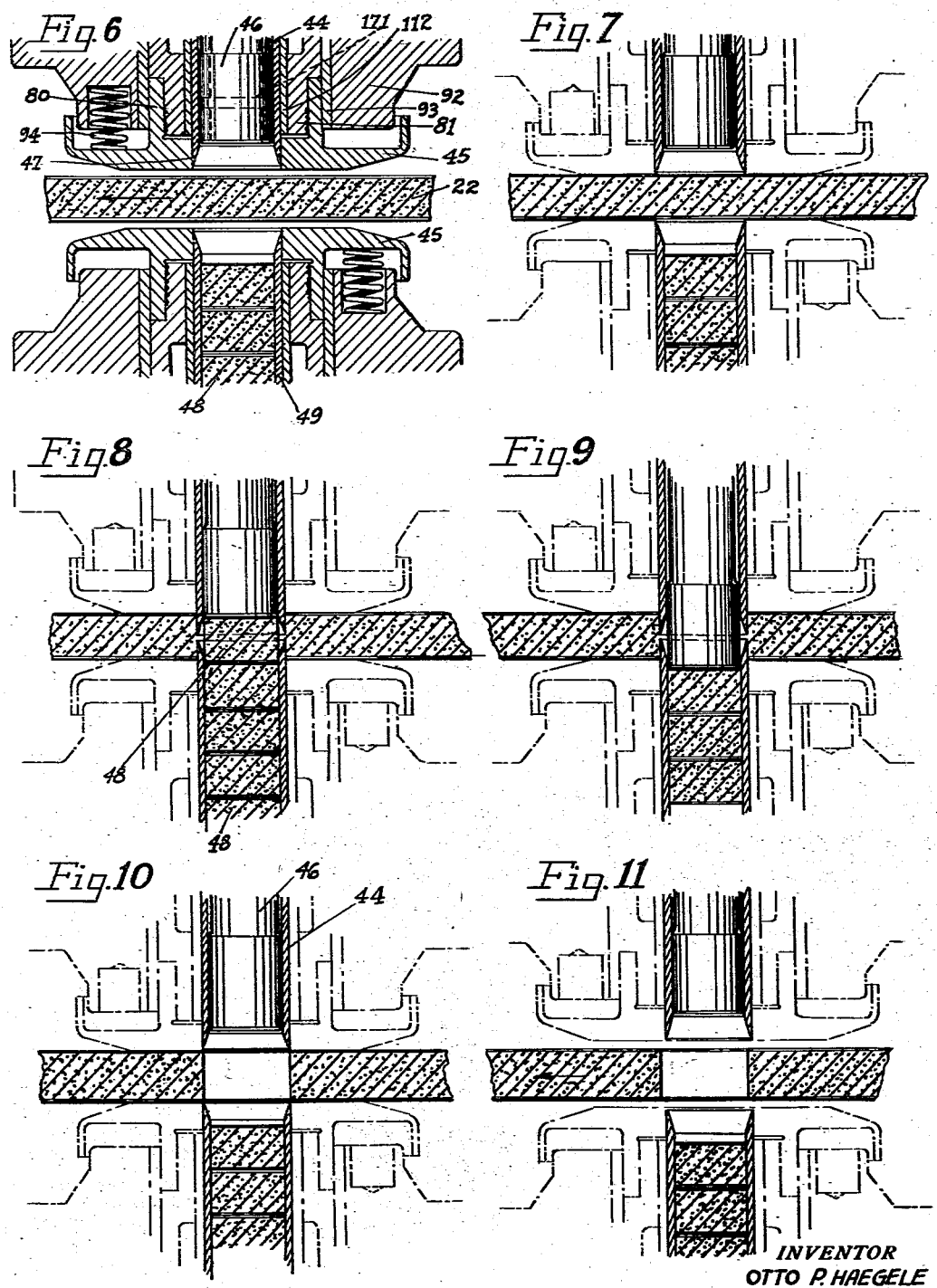

Patented Nov. 5, 1940

2,220,236

UNITED STATES PATENT OFFICE 2,220,236

PUNCHING MACHINE

Otto P. Haegele, Chicago, Ill., assignor to United States Gypsum Company, Chicago, Ill., a corporation of Illinois Application September 12, 1938, Serial No. 229,451

21 Claims. (Cl. 164—90)

This invention relates to punching machines and has reference more particularly to punching machines especially adapted for perforating gypsum plaster board or other types of boards used as a plaster base.

In the building industry, it is customary to use plaster boards for the construction of partitions, ceilings, etc., these boards being ordinarily constructed of a core composed of gypsum paste composition, said board being faced on each surface with a sheet of heavy paper. It has been found that if the board is provided with perforations, the layer of plaster which is subsequently applied to the board after erection makes a firmer bond with the board, so that the fire resistance of the partition or ceiling is materially enhanced. It has been proposed to produce these perforations in the board by drilling the boards in bundles with a multiple spindle drill. However, this drilling operation is somewhat expensive and tends to produce an excessive amount of dust in the factory and during erection of the finished board to form partitions and ceilings.

The plaster boards are ordinarily produced in one or more continuous streams by depositing a plastic gypsum mixture on the bottom cover sheet, folding the edges about the core and then applying a top cover sheet. After the boards are formed, they are permitted to set while continuously moving, are cut off into lengths, and the cut boards are then passed through a drying kiln. I have found that marked economies in manufacture are obtained by punching the holes in the board at a convenient point prior to cutting the boards into lengths. It is desirable that this punching operation be carried out without interrupting the continuous movement of the strips of board. With this manner of punching, the separate punching operation commonly used is avoided with a corresponding saving in manufacturing cost.

An object of this invention therefore, is to provide a punching machine which is arranged to punch holes in a gypsum plaster board while the core is still wet, and without interrupting the continuous movement of the strip of board.

Another object of the invention is to provide a punching machine in which the punches enter the wet board at a high speed so as to facilitate the punching operation and produce holes whose edges are cleanly cut; also to improve punching machines in other respects hereinafter specified and claimed.

Reference is to be had to the accompanying drawings forming a part of this specification, in which Fig. 1 is a partial elevational view of the improved punching machine, certain portions of the driving mechanism and of the supporting framework being omitted.

Figure 2:
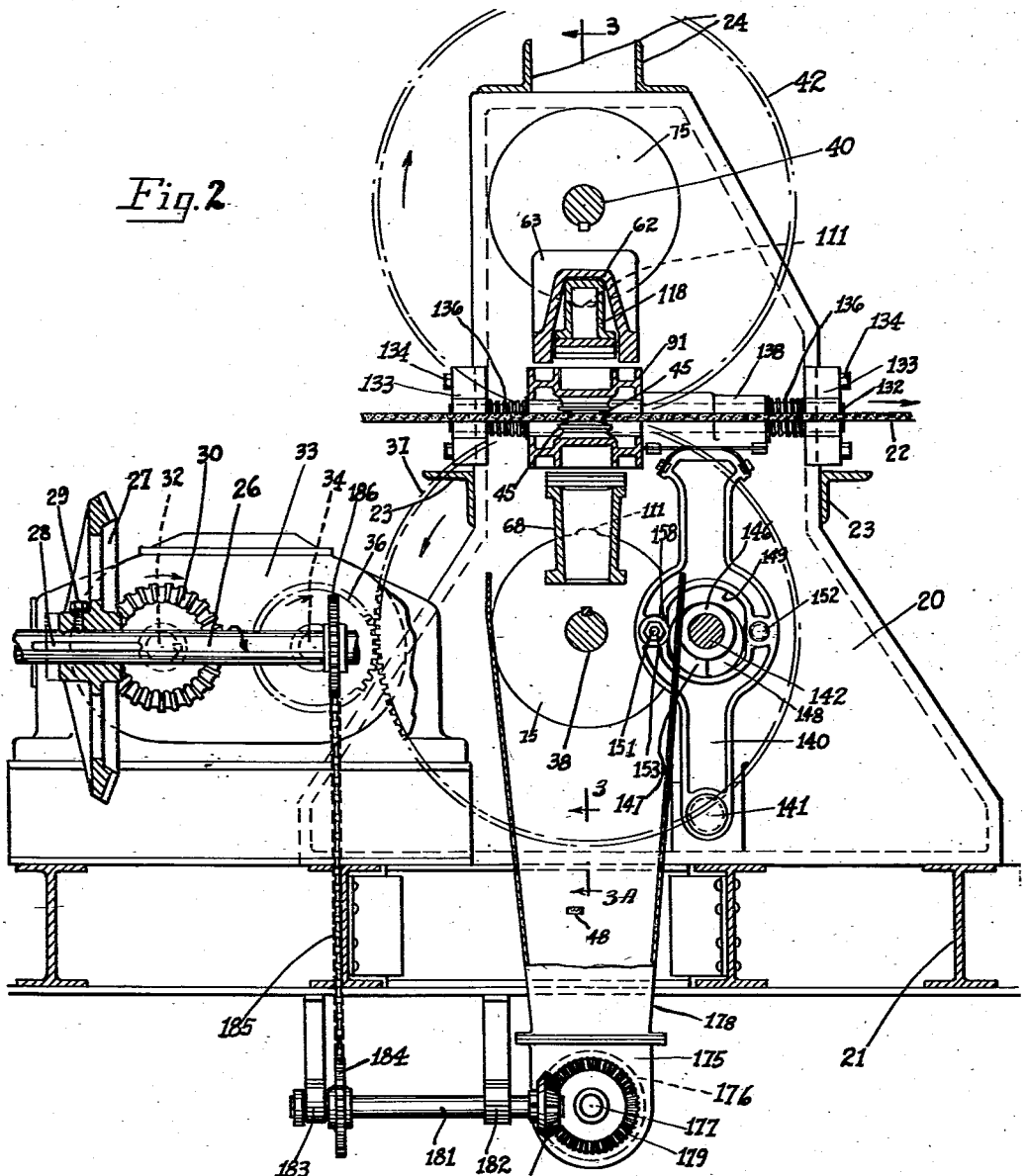
Figure 12:
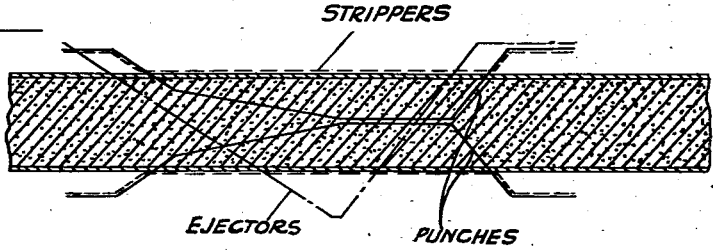

Fig. 1A is a plan view of the punching machine illustrating the arrangement of the portions of the driving mechanism omitted from Fig. 1, Fig. 2 is a sectional elevational view taken along the staggered section line 2—2 of Fig. 1A, certain parts which would not actually appear in a sectional view taken along this line being shown in phantom or in elevation in order more clearly to illustrate various portions thereof, Fig. 3 is a fragmentary central sectional view taken on line 3—3 of Fig. 2, certain parts being shown in elevation more clearly to illustrate the construction, Fig. 3A is a fragmentary sectional view taken along line 3A—3A of Fig. 2, Fig. 4 is a fragmentary sectional view on an enlarged scale, taken on line 4—4 of Fig. 1, Fig. 5 is a sectional elevation through a portion of the punching machine taken on line 5—5 of Fig. 4, Figs. 6-11, inclusive, are sectional elevations through one of the punching devices showing the punches in different positions, and Fig. 12 is a diagrammatic view of a plaster board showing the paths of movement of different parts of the punching machine.

Referring to the drawings by numerals, side frames 20 are arranged vertically in spaced relation, being supported upon a framework 21 of the board machine. One or more strips or streams of plaster board 22 are caused to move continuously in a horizontal plane between side frames 20. The frames 20 are connected by suitable angles 23 and 24 so as to form a rigid framework for supporting the moving parts of the punching machine. Roller conveyers, not shown, are usually provided to support the plaster board 22 on each side of the punching machine, or if desired, belts may be used for this purpose.

A line shaft 26 usually extends longitudinally of the board machine frame 21 and for operating my punching machine, I provide a beveled gear 27 on the line shaft 26, said gear being slidable on said shaft 26 by means of a feather key 28, a set screw 29 being provided on the hub of said beveled gear 27 to fix said gear in mesh with a beveled pinion 30 or to position said gear 27 out of mesh with the pinion 30 such as when wallboard is produced and no punching of holes is desired. The beveled pinion 30 is rigidly secured to a shaft 32 which extends into a gear box 33, said gear box containing suitable gearing for connecting the shaft 32 with a parallel shaft 34 in such a way as to cause the punching machine to be hereinafter described to operate in synchronism with a cut-off knife, not shown, used for cutting the boards into lengths.

A spur pinion 36 is secured to the shaft 34 outside of the gear box 33, said pinion meshing with a large spur gear 37 which is secured to a shaft 38. Bearings 39 rotatably support the ends of shaft 38 on the side frames 20 below the moving strip of plaster board 22. A shaft 40 is rotatably mounted above the strip of plaster board 22 by means of bearings 41 secured to side frames 20. A large spur gear 42 meshes with the gear 37 so as to accomplish the rotation of shafts 38 and 40 in unison but in opposite directions. In Fig. 2 the gears 37 and 42 which actually are not visible, due to the fact that the section line 2—2 is taken as indicated, are shown partially in phantom by broken lines in order to illustrate the relation of these gears to the pinion 36 and to the remainder of the punching machine.

The punching mechanism to be subsequently described consists of a series of upper cylindrical punches 44, annular stripper plates 45, ejector plungers 46 and lower punches 49. A series of the upper and lower punches 44 and 49 is arranged adjacent opposite faces of the board 22, said punches being arranged in pairs, each pair of punches 44 and 49 being coaxial and arranged for reciprocating movement toward and away from the board 22. The stripper plates 45 are also concentrically arranged adjacent the cutting edges 47 of punches 44, and said stripper plates are also arranged for slight vertical movement toward and away from the faces of the boards 22. The ejector plungers 46 are arranged concentrically within the punches 44 on one side of the board 22 and are mounted for reciprocating movement toward the board so as to push the plugs or punchings 48 from the holes in the board 22 and into the lower punches 49, to be subsequently ejected from the lower ends of said punches 49. The reciprocating parts, namely, the punches 44 and 49, the stripper plates 45 and the ejector plungers 46 are all suitably mounted in sliding supports so that by suitable mechanism to be described, the reciprocating parts are caused to travel with the board 22 during the punching operation so as to accomplish the punching without interrupting the continuous movement of the board 22.

In order to movably support the vertically reciprocating parts, a pair of liner pins 51 are rigidly secured one adjacent each side frame 20 by means of L-shaped brackets 52 which are secured to said side frames by bolts 53. Reduced sections 54 on the ends of the pins 51 engage in openings 55 in the brackets 52 so as to provide shoulders 56 to prevent any axial movement of the pins 51. An enlarged shoulder 58 is formed on each of the liner pins 51 and a compression spring 59 is mounted on said shoulder 58 between steel washers 60 and 61. A U-shaped beam 62 having suitable reinforcing ribs 63 extends between the liner pins 51 and has end sleeves 64 which extend around the upper section 65 of liner pins 51. Self-oiling sleeves or collars 66 are interposed between the sleeves 64 and the pin section 65 so as to reduce friction as much as possible and provide a continuous source of lubrication.

A cross beam 68 extends between the liner pins 51 below the board 22, said beam being preferably composed of two spaced apart walls with openings therebetween to permit the board slugs to fall out through the bottom of beam 68 as hereinafter described. The beam 68 is provided with end collars 70 which engage a lower section 71 of liner pins 51. Self-oiling collars or bushings 72 are provided between the pin sections 71 and the collar 70 so as to reduce friction and provide for self-lubrication.

The beam 62 is caused to reciprocate vertically by a pair of cams 75 and 76 which are secured to shaft 40 and engage hardened pressure plates 77 which are secured to the upper and inner surfaces of the end sleeves 64. The rotation of shaft 40 causes the cams 75 and 76 to move the beam 62 downwardly against the compression of compression spring 59 until washers 61 engage limit stops 78 formed by the shoulders 58. In Fig. 3 the beam 62 is shown in its lowermost position with the washers 61 engaging the stops 78.

The stripper plates 45 and punches 44 are reciprocated vertically by the vertical movement of beam 62. In order to accomplish this purpose, each of the stripper plates 45 is provided with an annular upstanding shoulder 80 (Fig. 4) which is threaded internally to receive the lower end of an annular collar 81. The upper end of each of the collars 81 is provided with an outstanding annular shoulder 81 and a sleeve 83 slidably engages about the collar 82, being provided at its lower end with an annular inwardly extending flange 84. A flattened outstanding flange 85 is formed at the upper end of opposite sides of each of the sleeves 83, said sleeve being slotted, as shown best in Fig. 3, to permit reciprocating movement of the slide bars 116 as hereinafter described and said flanges 85 being slidably received in grooves 86 formed in the outer edges of slide bars 87 which are secured by bolts 88 to the bottom legs 89 of beam 62. The stripper plates 45 are thus arranged to move with the board approximately 2" more or less on each side of the center line during the punching operation, the flanges 85 sliding in the grooves 86 during such movement. The collars 81 are slidably received in an upper cross bolster 91 which is provided at intervals with annular collars 92 for receiving the collars 81 and the stripper plates 45, self-oiling sleeves 93 being provided between collars 81 and 92. As shown, a limited vertical axial movement, i. e. approximately $\frac{3}{32}$ of an inch, of the stripper plates 45 and collars 81 relative to the bolster 91 is permitted and a plurality of compression springs 94 are provided around the bottom of collar 92 to bear on the upper face of stripper plates 45 and urge said plates toward the board 22. The downward movement of each of the stripper plates 45 under the force of the springs 94 is limited by a shoulder 95 formed on the associated collar 81, said shoulder 95 engaging an inwardly extending annular flange 96 formed on the bottom of a sleeve 97. A self-oiling bushing 98 is interposed between each of the sleeves 97 and its associated sleeve 83, and the upper end of each of the sleeves 97 is provided with an external thread 99 which engages the inside of an annular collar 100 in the bolster 91. By rotating the collars 97 one way or the other, the extent of the downward movement of collars 81 permitted thereby is adjusted so as to provide ample clearance for boards of different thickness and to control the position of the stripper plate relative to the surface of the board. Radial holes 101 are provided in each of the sleeves 97 and associated openings 102 are provided in the collars 100 for insertion of a tool to engage the openings 101 thus permitting rotation of the sleeve 97 for adjustment purposes. Openings 103 are provided in the upper surface of the collar 81 to receive a spanner arranged to hold the collar 81 stationary while the stripper plate 45 is being screwed into place. The stripper plate 45 normally contacts with the surface of the board 22 due to the action of springs 94 but upon movement of sleeves 83 to their uppermost position due to vertical movement of the beam 62 and the slide bars 87 the shoulder 84 on each sleeve 83 engages the shoulder 82 on the associated stripper plate to lift the stripper plates 45 clear of the face of the board.

In order to reciprocate the punches 44 I provide in connection with each of the punches an annular member 106 which is threaded externally so as to screw into internal threads formed on the inside upper part of the associated sleeve 83. Each of the members 106 is provided on its underside with a recess 107 which is threaded internally to receive a locking unit 108 which engages around the associated cylindrical punch 44, the upper surface of the nut 108 thus locking an annular flange 109 on the upper end of the punch 44 against the lower face of the annular flange 106 hold the punch 44 firmly in position. The punches 44 are thus mounted for vertical reciprocating movement with the sleeves 83 and as the cams 75 and 76 rotate, actuating shoulders 111 on said cams engage the pressure plates 77 to rapidly reciprocate the beam 62 and drive the punches 44 downwardly to perforate the board 22. The actuating shoulders 111 preferably only extend over about 15° of the peripheries of the cams 75 and 76 so that as said cams rapidly rotate exceedingly rapid movement of the punches 44 is secured thus enabling the punches to successfully cut the wet gypsum board without clogging. Self-oiling bushings 112 are secured inside of the collars 81 to slidably and concentrically engage the outside surface of the cylindrical punches 44.

In order to cause the vertical reciprocation of ejectors 46, I provide at the upper end of said ejectors, an annular flange 114 which is riveted in place on the shouldered end of said ejector. The flange 114 is slidably received in opposed slots 115 formed in a slide bar 116 (Figs. 3 and 4), the ends of said bar being secured by bolts 117 to a U-shaped cross beam 118 positioned within the beam 62. The ends of beam 118 are secured by pins 119 to liner pins 120, which are slidably mounted at the upper ends thereof in bushings 121 secured inside of shoulders 122 at each end of beam 62. The upper ends of liner pins 120 are resiliently pressed by compression springs 124 into contact with suitable cams 123 mounted upon shaft 40 which cams may be formed integral with the cams 75 and 76, so that as the shaft 40 rotates, the liner pins 120 are reciprocated vertically by the cams 123. The lower ends of liner pins 120 are slidably received in bushings 125 positioned within suitable bearing blocks 127 that are secured by locking bolts 128 (Fig. 1) to the end sleeves 64 of the beam 62.

A cross bolster 130 similar to the bolster 91 is provided below the board 22, the ends of said bolsters 91 and 130 being connected together by means of end brackets 131 to form a carriage. A round slide bar 132 passes through each of the end brackets 131, and the ends of said bars 132 are rigidly secured in brackets 133 (Figs. 1A and 2), said brackets being secured to side frames 20 by means of bolts 134. It will be observed that the relation of the lower set of punches 49 to the cross beam 68 and to the lower bolster 130 is substantially identical to the arrangement of the upper punches 44, the cross beam 62, and the upper bolster 91 except that no ejectors and associated parts are provided. The shaft 38, driven at the same speed as the shaft 40 by the large spur gears 37 and 42, is provided with cams 75 and 76 similar to the cams on the shaft 40, and these cams effect reciprocation of the beam 68 to operate the lower punches 49 toward the board 42 in synchronism with the movement of the upper punches 44 toward the board, the punches 49 being slidable through the bolster 130.

The bolsters 91 and 130 reciprocate longitudinally of the board 22 on the slide bars 132, compression springs 136 being provided around each end of each slide bar 132 to absorb the inertia of the reciprocating parts. A bearing sleeve 138 (Figs. 2 and 4) extends outwardly on one side of the bolsters 91 and 130 from each of the end brackets 131, said sleeves 138 being provided with an internal self-oiling bushing 139 for slidably engaging the slide bars 132.

In order to accomplish the reciprocation of the carriage composed of bolsters 91 and 130 with its associated parts, I provide a lever 140 adjacent each end of the carriage, each of the levers 140 being pivoted at its lower end on a pin 141. Extending across the punching machine and through apertures in each of the levers 140 intermediate the ends of the levers 140, I provide a shaft 142 which is driven from shaft 38 by means of a spur gear 143 meshing with a spur gear 144 on shaft 38. The spur gears 143 and 144 are equal in diameter so that shafts 38 and 142 rotate at the same speed. Since the levers 140 are identical in construction, only one will be described in detail. In order to cause the lever 140 to rock about pivot pin 141, I provide on the shaft 142 a cam collar 146 which has formed on its outer periphery, a pair of cams 147 and 148 which rotate inside of an annular opening 149 formed in the lever 140 (Figs. 4 and 5). Roller studs 151 and 152 are rigidly secured by nuts 153 and 154 respectively, to shoulders 155 and 156 formed on the lever 140. Rollers 157 and 158 mounted on the studs 152 and 151 engage the cams 147 and 148, respectively, so as to accomplish the rocking of lever 140 about its pivot pin 141. The upper end of lever 140 is provided with an upper semi-circular surface 160 which is positioned a short distance away from the bottom of the sleeve 138. Flexible metallic straps 162 and 163 are secured at their opposite ends by bolts 164 and 165, respectively, to the sleeve 138 and to downwardly curved shoulders 166 formed on lever 140. Straps 163 are preferably narrow and a pair of these straps is provided, while strap 162 which is positioned between the straps 163 is comparatively wide and a single one of these straps is provided. Thus as the lever 140 rocks back and forth about its pivot 141, the sleeve 138 with its associated parts reciprocates back and forth with the straps 162 and 163 under tension at all times to accurately reciprocate the carriage parts without friction.

The lower end of each of the ejectors 46 is provided with a self-lubricating bushing 170 locked into place by transverse pin 171, the outer periphery of the bushings 170 being slightly larger in diameter than the body of the ejectors 46 so as to engage the inner surface of the associated punches 44.

As the plugs 48 are pushed downwardly by ejectors 46, they pass in succession through the lower punches 49 and fall through openings 173 formed between webs 174 in cross beam 68. Plugs will strike on the shaft 38 and fall past said shaft into a screw conveyor housing 175 (Figs. 2 and 3A) which contains a screw conveyor 176 mounted upon a shaft 177. The conveyor housing 175 has a duct 178 extending upwardly about the shaft 38 so as to act as a guide to direct the plugs 48 into the conveyor housing 175. A beveled gear 179 secured to the end of conveyor shaft 177 meshes with a beveled pinion 180, said pinion being secured at a countershaft 181. Bearing brackets 182 and 183 rotatably support the shaft 181 and a sprocket wheel 184 on shaft 181 is connected by chain 185 to a sprocket wheel 186 which is secured to line shaft 26. The screw conveyor 176 conveys the plugs to one end of housing 175 where they fall from the housing to a suitable conveyor, not shown.

The machine is designed to successfully operate with the board 22 moving at a speed of at least 100' per minute. With a spacing of approximately 4" between perforations, as is commonly used in the art, the punches 44 would make approximately 300 strokes per minute. At this high speed of operation, it is necessary to reduce the weight of moving parts as much as possible and for this reason I construct the castings wherever possible of a light metal such as aluminum base. In Fig. 12 I show diagrammatically the movement of the punches, the strippers and the ejectors during a complete cycle of punching operation. In Figs. 6–11, inclusive, I show the position of the various vertically reciprocating parts during the cycle of operations as shown diagrammatically in Fig. 12. As a safety provision to insure shockless performance and mechanical return of cutters 44 and 49 from engagement with board 22, I provide rollers 190 and 191 (Fig. 3). The rollers 190 are rotatably mounted on the lower ends of liner pins 120, and the rollers 191 are rotatably mounted upon suitable bearings 192 on the end brackets 131. Inclined wedge plates 193 are rigidly mounted on the cross beam 68 to engage with rollers 191 and inclined wedge shaped plates 194 are secured to end brackets 131 so as to contact with rollers 190. Normally the rollers 190 and 191 are spaced slightly from the wedge plates 194 and 193, respectively, but if one of the springs 124 should break or the vertically reciprocating parts should stick, the wedge plates 193 and 194 engage the rollers 190 and 191 upon reciprocation of the carriage comprising the bolsters 91 and 130 and insure positive operation of the machine.

In operation the board 22 moves between the opposed punches 44 and 49 which are reciprocated vertically by means of cams 75 and 76 acting upon pressure plates 77 to cause beams 62 and 68 to be reciprocated vertically. The inward movement of beams 62 and 68 causes the shoulders 84 on sleeves 83 to disengage from shoulders 82 on stripper collars 81, thus causing stripper plates 45 to move into contact with the faces of board 22 under the action of springs 24. As the punches 44 and 49 enter the board to produce plugs 48, ejectors 46 move downwardly to push the plugs 48 downwardly into the lower punches 49, the plugs then dropping through openings 173 in the beams 68 to duct 178 and conveyor housing 175, said plugs being delivered from said housing 175 by screw conveyor 176 suitably driven from line shaft 126. The downward movement of the ejectors 46 is caused by the action of cams 123 on the upper ends of liner pins 120 which are secured to the beam 118. The upper ends of ejectors 46 slide in slide bars 116 and the upper ends of sleeves 83 slide in slide bars 87 as the horizontally reciprocating parts move with the board 22. Bolsters 91 and 130 connected by end brackets 131 slide on slide bars 132 to move with the board as the cutters 44 and 49 engage the board. This movement of the horizontally reciprocating parts is accomplished by levers 140 which are rocked about pivot pins 141 by means of cams 147 and 148 engaging rollers 157 and 158, said rollers being rotatably mounted on studs 151 and 152 secured to the levers 140. Flexible straps 162 and 163 secured to the bearing sleeves 138 and the upper ends of levers 140 make a frictionless and flexible positive connection between the upper ends of levers 140 and the horizontally reciprocating parts. In order to sharpen the punches 44 and 49 by internal grinding, the horizontally reciprocating parts are moved out of the machine and nuts 108 are unscrewed to free the punches 44 and 49 from their supporting parts. Springs 136 are mounted upon slide bars 132 so as to resiliently check the extreme movements of the horizontally reciprocating parts.

I would state in conclusion that while the illustrated example constitutes a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. In a plaster board punching machine, opposed series of cylindrical punches arranged for vertical movement adjacent each face of a moving strip of plaster board, means for reciprocating said opposed punches axially to cause said punches to substantially meet adjacent the center of said board to form plugs, ejector means movable axially in said punches on one side of said board to push said plugs out through said punches on the opposite side of said board, means for transversely moving said punches and ejectors with said board during said punching operation and means for maintaining each of the punches on one side of said board in coaxial alignment with an associated punch on the opposite side of said board during the entire axial and transverse movement of said punches.

2. In a plaster board punching machine, a series of punches arranged for vertical movement adjacent each face of a moving strip of plaster board, means for reciprocating said opposed punches axially to cause said punches to substantially meet adjacent the center of said board to form plugs, ejector means for ejecting said plugs from said board and punches, means for transversely moving said punches with said board during said punching operation and means for maintaining each of the punches on one side of said board in coaxial alignment with an associated punch on the opposite side of said board during the entire axial and transverse movement of said punches.

3. In a punching machine, a plurality of substantially cylindrical punches disposed adjacent a moving strip of material, means for imparting reciprocating movement to said punches in a path substantially parallel with said moving strip of material whereby said punches during a portion of said movement travel with said material, means for axially reciprocating said punches during said portion of said movement to penetrate said material and form partially severed plugs therein, ejectors in said cylindrical punches, means mounting said ejectors for movement with said punches along said path, and means for axially reciprocating said ejectors independently of but in timed relation to said axial reciprocation of said punches to rupture said material and eject said plugs from the plane of said material during movement of said punches and ejectors with said material.

4. In a punching machine, a plurality of pairs of opposed cylindrical punches disposed adjacent opposite faces of a strip of moving material, means for transversely reciprocating said punches to cause the same periodically to travel with said material, means for maintaining each pair of opposed punches in coaxial alignment with each other throughout said entire transverse movement, means for axially reciprocating said opposed punches to cause said punches to penetrate opposite surfaces of said strip substantially simultaneously and form partially severed plugs therein, ejector means positioned in the punches on one side of said material and mounted for transverse movement with said punches, and means for axially reciprocating said ejector means in timed relation with the axial reciprocation of said punches to rupture said material and push said plugs through the punches on the opposite side of said material.

5. In a punching machine, a series of cylindrical punches arranged on each side of a moving strip of material to form coaxially aligned pairs of oppositely disposed punches, stripper plates and ejectors associated with said punches, means for axially moving said punches, ejectors, and stripper plates toward and away from said material to first cut each side of said material to partially form plugs therein and to then rupture said material solely by pressure on one side of said partially formed plugs to completely form said plugs and to eject said plugs through their opposite axially disposed punches, and means synchronized with said last mentioned means for moving said punches, stripper plates, and ejectors with said material during said plug forming and ejecting operation.

6. In a punching machine, a carriage including members mounted adjacent each face of a moving strip of sheet material, means for reciprocating said carriage along a rectilinear path to cause said carriage to move with said material a predetermined distance and to return to its original position, punches supported in said members of said carriage adjacent each face of said material, means for moving said punches axially during the movement of said carriage and material so that said punches closely approach approximately in the center of said sheet, and means for rupturing the uncut material between said punches and ejecting the resulting plugs of material.

7. In a punching machine, a plurality of punches adjacent opposed faces of a moving strip of material, carriage means for supporting said punches in coaxial pairs, a rock lever connected to said carriage and arranged to cause the movement of said carriage with said material, and means for reciprocating said punches axially to partially sever said material to form plugs therein, and means to completely rupture said material to form and eject said plugs and produce punched holes in said material.

8. In a punching machine, a plurality of punches adjacent a moving strip of material, a carriage for supporting said punches, means slidably mounting said carriage for movement in a rectilinear path, a rock lever, flexible straps for connecting said lever to said carriage, means for rocking said lever to cause movement of said carriage and punches with said material, and means for reciprocating said punches axially during said movement of said carriage and punches to partially sever said material to form plugs therein, and means to completely rupture said material to form and eject said plugs and produce punched holes in said material, the speed of movement of said carriage during reciprocation of said punches being substantially equal to the speed of movement of said material.

9. In a punching machine, a plurality of punches adjacent a moving strip of material, a carriage for supporting said punches, means slidably mounting said carriage for movement in a rectilinear path, a pivoted rock lever, means interconnecting said carriage and said rock lever for converting rocking movement of said lever into rectilinear movement of said carriage, cam means for rocking said lever and causing said carriage and punches to move with said material, and means for reciprocating said punches axially during said movement of said carriage to partially sever said material to form plugs therein, and means to completely rupture said material to form and eject said plugs and produce punched holes in said material, said cam means causing said carriage to move at substantially the same speed as said material during reciprocation of said punches.

10. In a punching machine, a plurality of punches adjacent a moving strip of material, slide bars, a carriage slidably supported on said slide bars for supporting said punches, means for positively reciprocating said carriage and punches, spring means on opposite sides of said carriage for limiting the reciprocation of said carriage in each direction on said slide bars, said spring means being effective to absorb the kinetic energy of said carriage at its extreme limits of movement, and means for reciprocating said punches axially to produce punched holes in said material.

11. In a punching machine, a plurality of punches arranged adjacent each face of a moving strip of material in coaxial pairs, stripper plates adjacent said punches, ejector rods reciprocating in said punches, means for reciprocating said stripper plates, said punches and said ejector rods in timed relation with each other so as to produce punched holes in said material, and means for moving said stripper plates, said punches and said ejector rods with said material during said punching operation.

12. In a punching machine, a plurality of punches arranged adjacent each face of a moving strip of material, slidably supported bolsters carrying said punches, a pair of telescoping U-shaped beams adjacent said bolsters, liner pins supporting said beams, cam means for vertically and independently reciprocating said beams, ejector rods and stripper plates adapted to be vertically reciprocated by said beams, and means for moving said bolsters, punches, ejector rods and stripper plates with said material during a punching operation.

13. In a punching machine, a plurality of punches positioned in opposed, coaxial pairs adjacent each face of a moving strip of material, liner pins adjacent each edge of said material, cross beams slidably mounted on said pins for vertical reciprocation, a carriage supporting said punches and slidably associated with said cross beams for movement with said material during a punching operation, cam means for reciprocating said beams, and spring means for resiliently limiting the reciprocating movement of said beams.

14. In a punching machine, a plurality of punches positioned in opposed, coaxial pairs adjacent each face of a moving strip of material, cross beams carrying said punches and mounted for vertical reciprocation adjacent each face of said material, cam means for moving said beams toward said material, spring means for moving said beams away from said material, and wedge means acting to move said beams away from said material in case of failure of said spring means.

15. In a punching machine, a pair of beams supported for vertical reciprocating movement adjacent a moving strip of material, a plurality of punches connected to one of said beams for transverse movement relative thereto and for vertical movement therewith, ejectors associated with said punches and similarly connected to the other of said beams, means for independently reciprocating said beams in timed relation to cause vertical reciprocation of said punches and ejectors, and means for transversely moving said punches and ejectors with said material during said vertical reciprocation to punch said moving strip of material.

16. In a punching machine, a pair of beams supported for vertical reciprocating movement adjacent a moving strip of material, a plurality of punches connected to one of said beams for transverse movement relative thereto and for vertical movement therewith, ejectors associated with said punches and similarly connected to the other of said beams, stripper plates associated with said punches, means for effecting reciprocation of said stripper plates in timed relation to said punches upon reciprocation of said punches, means for independently reciprocating said beams in timed relation to cause vertical reciprocation of said punches, said stripper plates and said ejectors, and means for transversely moving said punches, said stripper plates and said ejectors during said vertical reciprocation to punch said moving strip of material.

17. In a punching machine, a pair of beams supported adjacent a moving strip of material for movement at right angles thereto, a carriage positioned between said strip and said beams, means mounting said carriage for movement substantially parallel to said moving strip, a plurality of hollow punches cooperatively supported in slidable relation thereto by one of said beams and by said carriage, ejectors in said punches slidably supported by the other of said beams, means for independently reciprocating said beams to move said punches and ejectors in timed relation to each other at right angles to said moving strip, and means for reciprocating said carriage to move said punches and ejectors with said moving strip during reciprocation of said beams, thereby to punch said material.

18. In a punching machine, a cross beam supported adjacent a moving strip of material for movement at right angles thereto, a carriage supported between said beam and said material for movement substantially parallel to said strip of material, a plurality of punches cooperatively and slidably supported by said beam and said carriage, whereby said punches slide relative to said carriage upon movement of said beam and slide relative to said beam upon movement of said carriage, stripper plates slidably mounted in said carriage and associated with said punches, means responsive to reciprocation of said punches relative to said carriage for reciprocating said stripper plates in timed relation to said punches, means for reciprocating said beam to move said punches and stripper plates at right angles to said strip of material to cause said stripper plates periodically to engage said material and said punches periodically to pierce said material, and means for reciprocating said carriage to move said punches and stripper plates with said material during said engaging and piercing operation.

19. In a punching machine, a carriage mounted for reciprocating movement substantially parallel to a moving strip of material, a plurality of stripper plates journaled in said carriage for reciprocating movement toward and away from said material as said carriage moves with said material, punches associated with said stripper plates and movable toward and away from said material to punch said material, means for reciprocating said punches in timed relation to the reciprocating movement of said carriage, and means responsive to reciprocation of said punches for effecting reciprocation of said stripper plates in timed relation to the movement of said punches.

20. In a punching machine, a cross beam mounted for reciprocation substantially at right angles to an adjacent moving strip of material, a plurality of punches carried by said beam for movement toward and away from said material, said punches being mounted for movement transversely of said beam, a carriage engaging said punches and mounted for movement with said material during a punching operation, cam means for moving said beam and punches toward said material, spring means for moving said beam and punches away from said material, and normally inoperative means responsive to movement of said carriage for positively moving said beam and punches away from said material in the event of failure of said spring means.

21. In a punching machine, a series of cylindrical punches arranged on each side of a moving strip of material to form coaxially aligned pairs of oppositely disposed punches, means for axially moving said punches to cut each side of said moving material to partially form plugs therein, and means to apply only rupturing pressure to one side of each partially formed plug to completely form said plug and to eject said plug through the opposite coaxially aligned punch.

OTTO P. HAEGELE.

CERTIFICATE OF CORRECTION.

Patent No. 2,220,236.  November 5, 1940.

OTTO P. HAEGELE.

It is hereby certified that error appears in the printed specification of the above numbered patent requiring correction as follows: Page 3, first column, line 24, for the word "unit" read --nut--; line 29, before "hold" insert --to--; and second column, line 34, strike out the reference numeral "140"; line 69, after "46" insert --as shown in Fig. 4 is of reduced diameter and--; page 4, first column, line 60, for "betwen" read --between--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.